(12) United States Patent
Shukla et al.

(10) Patent No.: US 8,505,084 B2
(45) Date of Patent: Aug. 6, 2013

(54) DATA ACCESS PROGRAMMING MODEL FOR OCCASIONALLY CONNECTED APPLICATIONS

(75) Inventors: Dharma K. Shukla, Sammamish, WA (US); Matthew J. Burdick, Sunnyvale, CA (US); Arash Ghanaie-Sichanie, Bothell, WA (US); Matthew S. Augustine, Seattle, WA (US); Hari Krishnan, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 932 days.

(21) Appl. No.: 12/418,658

(22) Filed: Apr. 6, 2009

(65) Prior Publication Data

US 2010/0257578 A1    Oct. 7, 2010

(51) Int. Cl.
*G06F 12/14*   (2006.01)
*G06F 15/16*   (2006.01)
*G06F 21/02*   (2006.01)

(52) U.S. Cl.
USPC ............... 726/9; 709/219; 709/229; 713/182

(58) Field of Classification Search
None
See application file for complete search history.

(56) References Cited

U.S. PATENT DOCUMENTS

| | | | |
|---|---|---|---|
| 6,055,637 A * | 4/2000 | Hudson et al. | 726/20 |
| 6,438,600 B1 | 8/2002 | Greenfield et al. | |
| 6,539,424 B1 | 3/2003 | Dutta | |
| 6,691,230 B1 | 2/2004 | Bardon | |
| 6,836,888 B1 | 12/2004 | Basu et al. | |
| 7,444,678 B2 | 10/2008 | Whitmer et al. | |
| 7,478,434 B1 * | 1/2009 | Hinton et al. | 726/27 |
| 7,836,493 B2 * | 11/2010 | Xia et al. | 726/9 |
| 7,882,352 B2 | 2/2011 | Dive-Reclus et al. | |
| 2002/0031230 A1 * | 3/2002 | Sweet et al. | 380/278 |
| 2003/0172145 A1 | 9/2003 | Nguyen | |
| 2004/0002976 A1 | 1/2004 | Lucovsky | |
| 2004/0054793 A1 | 3/2004 | Coleman | |
| 2005/0149726 A1 | 7/2005 | Joshi et al. | |
| 2006/0089967 A1 | 4/2006 | Gutmans et al. | |
| 2006/0155776 A1 * | 7/2006 | Aust | 707/201 |
| 2006/0174334 A1 | 8/2006 | Perlin et al. | |
| 2007/0050854 A1 | 3/2007 | Cooperstein et al. | |

(Continued)

OTHER PUBLICATIONS

Tao, Han, "A XACML-based Access Control Model for Web Service", 2005, http://ieeexplore.ieee.org/stamp/stamp.jsp?arnumber=01544254.

(Continued)

*Primary Examiner* — Philip Chea
*Assistant Examiner* — Fatoumata Traore
(74) *Attorney, Agent, or Firm* — Microsoft Corporation

(57) ABSTRACT

Portions of a computing environment (such as a user's mesh) may restrict accessing to particular types of access by particular applications. The computer may support applications executing within a virtual environment (such as a web browser) by brokering such access through a token-based system. When an application requests a particular type of access (e.g., writing to a particular data object), the computer may contact an authorization server with the credentials of the application to request the specified access, and may receive and store an authorization token. The computer may then access the computing environment with the authorization token, and may return the results to the application within the virtual environment. Additional features may further support such applications; e.g., a programmatic interface may be provided in a familiar language, such as JavaScript, whereby applications can request access to particular data objects and identify authorized access capabilities.

20 Claims, 5 Drawing Sheets

U.S. PATENT DOCUMENTS

| | | |
|---|---|---|
| 2007/0294530 A1 | 12/2007 | Zlotnick |
| 2008/0083031 A1 | 4/2008 | Meijer et al. |
| 2008/0313648 A1 | 12/2008 | Wang et al. |
| 2009/0210702 A1 | 8/2009 | Welingkar et al. |
| 2010/0173608 A1 | 7/2010 | Lundblade et al. |
| 2012/0041842 A1 | 2/2012 | Adelman et al. |

OTHER PUBLICATIONS

"Java Security Architecture", pp. 1-3, http://java.sun.com/j2se/1.4.2/docs/guide/security/spec/security-spec.doc1.html.

Seltzer, Larry, "Google Sandboxing Tries to Make Browsing Safer", Dec. 16, 2008, pp. 1-3, http://www.eweek.com/c/a/Security/Google-Sandboxing-Tries-To-Make-Browsing-Safer/.

"Important Security Considerations for Shared Web Hosting", Aug. 1, 2008, http://www.articlesbase.com/web-hosting-articles/important-security-considerations-for-shared-web-hosting-505623.html.

Meier et al., "Chapter 20—Hosting Multiple Web Applications", Jun. 2003, pp. 1-11, http://msdn.microsoft.com/en-us/library/aa302436.aspx.

"SELinux—Highly Secured Web Hosting for Python-based Web Applications", pp. 1-6, http://www.packtpub.com/article/selinux-secured-web-hosting-python-based-web-applications.

Shiflett, Shris, "Security Corner: Shared Hosting", Mar. 23, 2004, pp. 1-26, http://shiflett.org/articles/shared-hosting.

"We Provide Web Hosting for South Africa", 1997-2009, pp. 1-6, http://www.epnetwork.co.za/web-hosting-microsoft.asp.

"Web Sandbox Architecture: Pipeline", 2008 Microsoft Live Labs, pp. 1-6, http://websandbox.livelabs.com/documentation/arch_pipe.aspx.

"Windows Shared Web Hosting (ASP, ASP.NET)", 1998-2009 Firstsery Limited., http://www.firstserv.com/hostingServices/sharedHosting/windows/.

U.S. Appl. No. 12/429,954, filed Apr. 24, 2009, Augustine et al.

Non Final Office Action in U.S. Appl. No. 12/429,954 dated Aug. 18, 2011, pp. 1-275.

Response to Non Final Office Action in U.S. Appl. No. 12/429,954 dated Nov. 18, 2011, pp. 1-20.

Final Office Action in U.S. Appl. No. 12/429,954 dated Apr. 25, 2012, pp. 1-40.

Moodle01, "Run multiple instances of Moodle without duplicating base code?". Forum posts from Sep. 29, 2004 through Jan. 23, 2008; moodle.org; pp. 1-18; retrieved from http://moodle/org/mod/forum/discuss.php?d=13211 on Apr. 19, 2012.

Google; "Google App Engine Developers Guide", Jan. 15, 2009; code.Google.com/appengine; various excerpts; pp. 1-145; retrieved from http://web.archive.org/web/20090227060429/http://code.google.com/appengine/downloads.html on Aug. 11, 2011.

Hickson, et al; "HTML 5", Apr. 23, 2009; W3C Working Draft; www.w3.org; various excerpts; pp. 1-88; retrieved from http://www.w3.org/TR/2009/WD-html5-20090423 on Aug. 11, 2011.

Amendment cited in U.S. App. No. 12/429,954 Dated: Jul. 25, 2012, pp. 1-27.

\* cited by examiner

DATA ACCESS PROGRAMMING MODEL FOR OCCASIONALLY CONNECTED APPLICATIONS

BACKGROUND

In the field of computing, applications may be configured to execute in various contexts. An application may execute natively, such as a basic process executing in an operating system, and may be delegated a full set of access rights accorded to the user executing the application. Alternatively, an application may execute within a virtual environment, such as a web application executing in a web browser. However, applications may originate from a variety of sources, many of which may be untrusted, and an incorrectly or maliciously written application might interfere with aspects of the computing environment, such as deleting files in the filesystem, corrupting user profiles, or stealing passwords and other security credentials from the operating system. Applications may also work with particular or sensitive data that might be compromised by other applications. Therefore, virtual environments often implement an isolation policy for various applications, such as restricting access of the application to the computing environment and restricting access to application resources of an application by other applications. Some virtual environments may permit a coarse-grain adjustment of the isolation policy for different applications, e.g., by identifying an application (or a set of applications, e.g., any web application hosted on a particular website) as "trusted" and authorizing the application for a broader set of access privileges to the computing environment.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A coarse-grain access model whereby applications may be hosted in virtual environments may feature several disadvantages. For example, a user may wish to authorize the application to access only a portion of the computing environment (e.g., a particular set of files, or only files of a particular type), or only a particular type of access (e.g., only read access), or an authorization to access data objects only in a local context, and a restriction against transmitting such data objects to an application host (e.g., a webserver hosting a web application.) Moreover, it may be desirable to allow applications to interact with the authorization mechanism; e.g., the application may request an authorization from the virtual environment, which may query the user to grant or deny the authorization.

One technique for providing such authorizations to access the computing environment involves an authorization token system, wherein an authorization server related to the computing environment may issue security tokens respectively authorizing a particular application to access a particular portion of the computing environment, and in particular ways (e.g., read/write capabilities, a limited-time duration, and whether or not the data objects may be shared with the application host.) An authorization requesting component may request such authorizations on behalf of applications hosted in the virtual environment, and may store received authorization tokens in an authorization token store. A computing environment component may then interface with the computing environment, and may, on behalf of an application, perform various operations on secured portions of the computing environment by retrieving the authorization token and using the authorization token to access the computing environment. Additional features may also be incorporated to facilitate the accessing of the computing environment; e.g., a programmatic interface may be provided to allow applications to request authorization tokens, and the virtual environment may provide an authorization request mechanism that interacts with the user to determine user authorizations of various applications.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
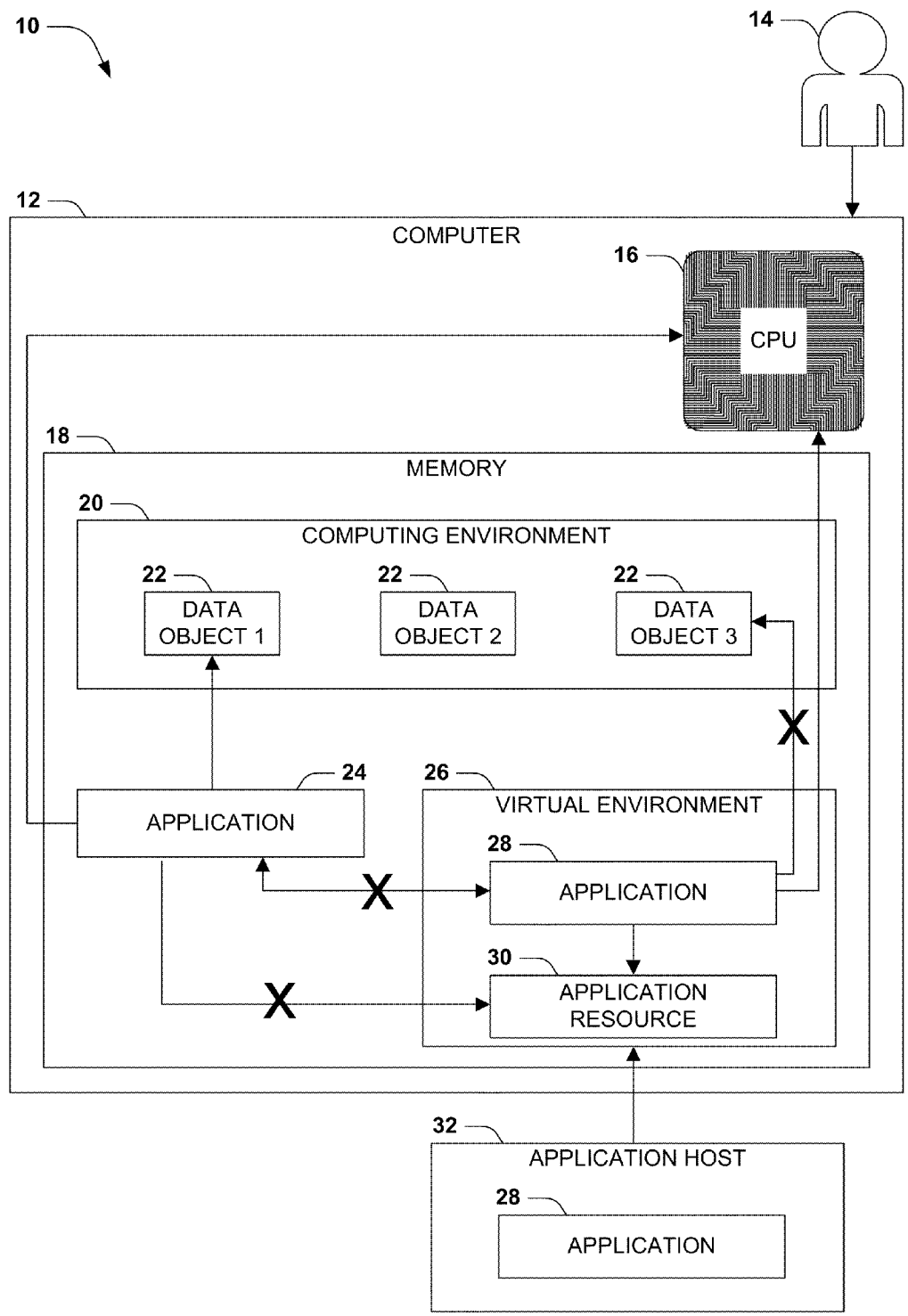
FIG. 1 is a component block diagram illustrating an exemplary scenario featuring applications executing in various contexts and interacting with a computing environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

In the field of computing, many types of applications executing on a computer may be developed that interact with an application host that provides some functionality for the application. For example, an application host may provide the application to the computer system over a network for local execution; the application host may handle a portion of the processing of the application, or may even execute the logic of the application on behalf of the application while the computer provides an interface to the remotely executing application; and/or the application host may store some data objects that are used by the application, such as media files rendered by a media viewer application or a database exposed to a user through a data-driven application. The application host often communicates with the computer system over a network, and the application may initiate by first contacting the application host.

Such applications may also execute in various contexts. A natively executing application may operate as a process within the operating system, and may be granted a full set of privileges to access the various data objects comprising the computing environment (e.g., files in the filesystem; executable binaries stored in an assembly cache; application and operating system configuration information stored in a system registry; user profiles stored by the operating system; and security credentials, such as certificates and passwords, stored in a protected access portion of memory.) Alternatively, an application may execute within a virtual environment, such as a web browser. A virtual environment may provide many advantages as compared with native execution of the application. As a first example, an application may not be fully trusted, such as an application received from an untrusted party that may endeavor to perform incorrect or malicious operations on the computer system. The virtual environment may facilitate the execution of such applications by isolating the application from accessing the computing environment, thereby limiting the potential damage that might be caused by the untrusted application. Conversely, the virtual environment may isolate the application from interference by other applications, and may therefore safeguard the application resources utilized by the application. As a second example, an application may perform operations that are differently achieved on different computer systems, and the virtual environment may provide an interface for the application that accepts requests in a less system-dependent manner and adapts such operations to the particular computer system. For example, a web browser may allow applications written in a popular but system-independent computer language, such as JavaScript, to execute appropriately on a computer system in view of its particular capabilities. As a third example, a virtual environment may combine the application with other data objects; e.g., a web browser may present an application to a user not as a standalone application, but embedded in other visual content of a website serving as the application host.

Based on these and other considerations, the virtual environment may (e.g., by default) institute an isolation policy that restricts the application from accessing the computing environment. However, some virtual environments may permit a user to alter the isolation policy with respect to an application or application host. For example, a web browser may allow a user to identify an application or website as "trusted," thereby permitting a limited amount of interaction with the computing environment (e.g., an application may receive files in the local filesystem selected by a user), or as "untrusted," thereby restricting such accessing. Such broad classifications of rights comprising the isolation policy of the application may be useful, e.g., for simplifying for the user the task of designating trust and rights for the application.

FIG. 1 illustrates an exemplary scenario 10 featuring a computer 12 operated by a user 14 and having at least one processor 16 and a memory 18. The memory 18 includes a computing environment 20 comprising a set of data objects 22. These data objects 22 may be of various types and may be accessible through various data object systems, such as files in a filesystem, configuration information for applications and the operating system stored in a registry, user profiles stored in a user profile system, database records stored in a database system, contacts stored in an address book, and security credentials, such as passwords and certificates, stored in a protected section of memory. Also stored in the memory 18 and executing on the processor 16 is an application 24 that is natively executing within the computer 12 (e.g., as a user process serviced by the operating system) that interacts with the computing environment 20. For example, an email application may read or write email messages to an email box stored in a filesystem; may access contacts stored in an address book for addressing email messages; and may utilize a user's security credentials stored in the protected memory section. Also stored in the memory 18 is a virtual environment 26, such as a web browser, wherein applications may be virtually hosted and executed by the processor 16. Such applications may be received, e.g., from an application host 32, which may store various application resources 30 of the application 28 and may deploy such application resources 30 to the computer 12 at the request of the user 14. Moreover, virtually hosted applications 28 may be executed within the virtual environment 26 according to an isolation policy. For example, an application 28 hosted by the virtual environment 26 may execute on the processor 16, but may be restricted from accessing data objects 22 in the computing environment 20. Instead, the application 28 may be permitted to store application resources 30 (e.g., application binaries stored in the virtual environment 26 for offline access and documents created by the application 28 and saved by the user 14) within the virtual environment 26, e.g., within a web browser cache, where such application resources 30 may be isolated from access by other applications, both within the virtual environment 26 (e.g., according to a cross-domain policy) and natively executing within the computer 12. In addition, the application 28 within the virtual environment 26 may be isolated from accessing an application 24 executing outside of the virtual environment 26, and vice versa, in order to preserve the integrity of both applications.

While the isolation of an application within a virtual environment and the broad details of the isolation policy may have some advantages, it may be inadequate in other aspects. As a first example, the user 14 may wish to authorize an application 28 executing within the virtual environment 26 to access a portion of the computing environment 20. However, instead of delegating a full set of access privileges to the application 28 (corresponding to the full set of privileges extended to the user 14), the user 14 may wish to specify particular details of the authorization of the application 28, such as a particular portion of the computing environment 20, a particular type of access (e.g., read-only access), and/or a permission or restriction to exchange accessible information with the application host 32. As a first example, an office application may allow the user 14 to generate and save documents, and the user 14 may wish to permit the application to read and write document-type data objects 22 within the computing environment 20, but to restrict the application 28 from accessing any other types of data objects 22. As a second example, a user 14 may wish to allow an archiving application associated with online backup service to read a large portion, or even the entirety, of the computing environment 20 in order to create a backup image, but may restrict write access to any data object 22 within the computing environment 20. As a third example, the user 14 may wish to allow an application 28 received from an application host 32 to access privacy-sensitive data objects 22 in the computing environment 20, such as medical records or user credentials, but may limit the authorization to local execution by the application 28 on the computer 12, and may restrict the application 28 from transmitting such information to the application host 32 (or any other destination outside of the computer 12.) However, a coarse-grain isolation policy, such as allowing the user 14 to designate the application 28 or application host 32 as having a particular level of trust, may be inadequately general, and may not relate to the particulars of the computing environment 20. Moreover, the application 28 may be unable to participate in the authorization process; e.g., the application 28 may be unable to identify its authorized capabilities in an easy manner, and may be unable to interact with the user 14 to establish and maintain such authorizations; the user 14 may simply be permitted to specify at trust level within the user interface of the virtual environment 26.

One technique that may allow a user to authorize applications to perform specific types of accesses of the computing environment involves a token-based model, wherein an application may perform a particular access of a portion of the computing environment (e.g., reading or writing a particular data object) using a security token issued by an authorization server. An application may be permitted to access a protected portion of the computing environment, but only if an authorization token is provided that verifies that the application is permitted to access the portion in the requested manner. These authorization tokens may be generated, e.g., by an authorization server, which may internally store a list of authorizations granted by the user to various applications. For example, the computing environment may comprise a cryptographic public key, and the authorization server may internally store the corresponding cryptographic private key. Upon receiving a request for an authorization token authorizing a particular type of access, the authorization server may verify the requested access according to its authorizations list (e.g., by verifying the identity of the requester and that the requester is permitted to access the specified portion of the computing environment.) Upon verifying the requested access, the authorization server may generate an authorization token, cryptographically sign it with the private key, and return the authorization token in fulfillment of the request. The application may then submit the access request to the computing environment (or to an interface regulating such access), along with the authorization token. Upon receiving the request, the computing environment may verify the authenticity of the authorization token against the cryptographic public key, and may perform the requested accessing if the authorization token is authenticated and indicates an authorized accessing by the requester.

This token-based authorization model may be utilized in many ways. As one example, the user's computer may comprise an authorization token store, where authorization tokens issued for particular applications may be stored; an authorization requesting component that may request such authorization tokens from the authorization server on behalf of such applications and store received tokens in the authorization token store; and a computing environment component that performs such accesses on behalf of applications using the corresponding authorization tokens. This modeling of the access privileges of the applications may present many advantages, such as a fine-grain and robust capability of specifying access authorizations for particular applications and persistence of the authorization tokens (e.g., by storing the authorization tokens in the computing environment, and allowing virtually hosted applications to interact with the user in requesting and establishing such access authorization.) Moreover, a programmatic interface may be provided within the virtual environment to permit developers to configure applications to utilize the security model in a convenient and familiar manner; e.g., a web browser may feature a JavaScript plug-in or API that exposes operations that an application may invoke to request a particular type of authorization, to identify the authorized access privileges of the application, and/or to apply such authorizations in the accessing of the computing environment.

Figure 2:
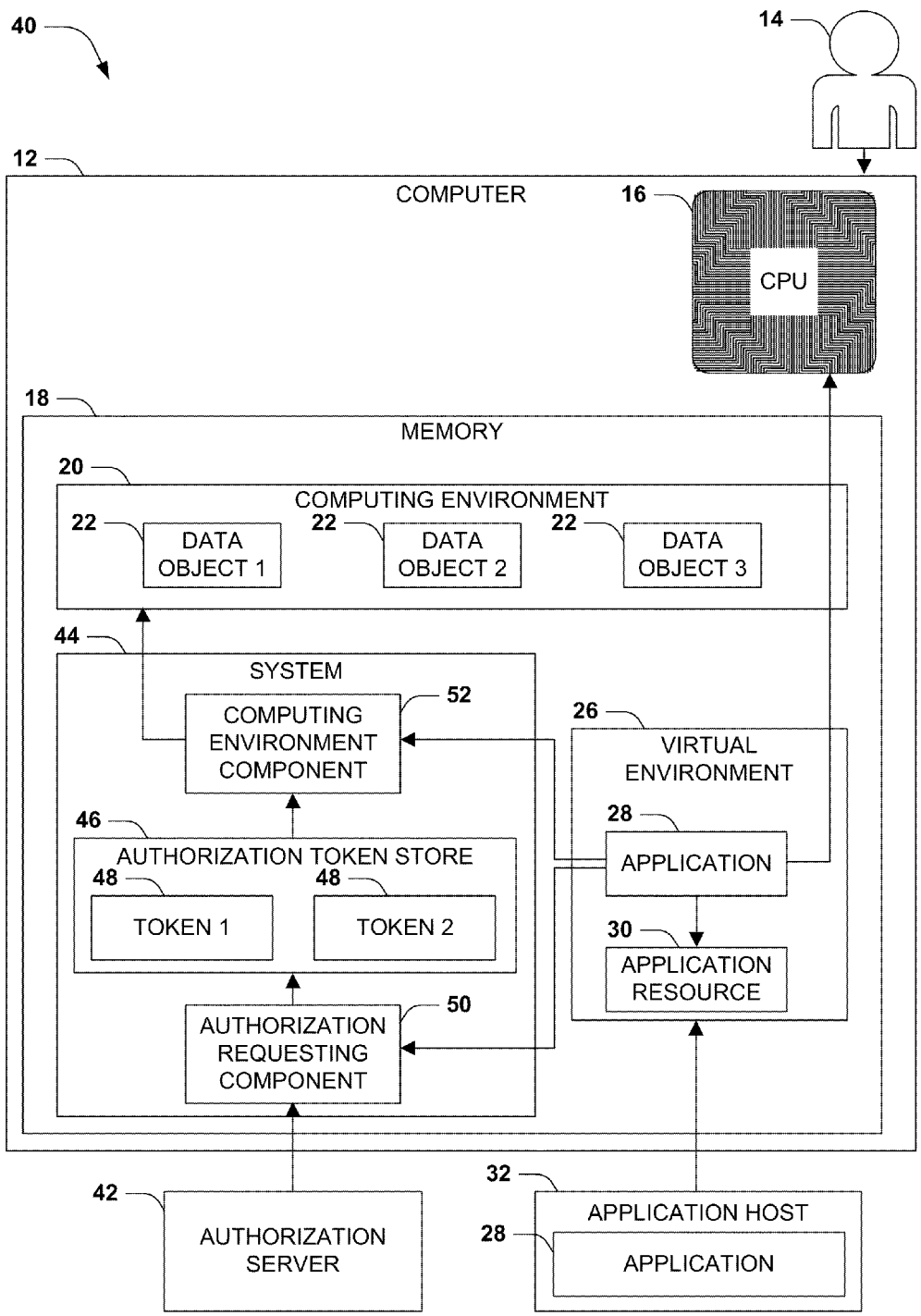
FIG. 2 is a component block diagram illustrating an exemplary system configured to access a portion of a computing environment secured by an authorization server on behalf of an application executing within a virtual environment.

FIG. 2 illustrates an exemplary embodiment 40 of the techniques discussed herein, again featuring a computer 12 operated by a user 14 and having a processor 16 and a memory 18. The memory 18 in this exemplary embodiment 40 again features a computing environment 20 comprising various data objects 22, and a virtual environment 26 hosting an application 28 comprising various application resources 30 received from an application host 32. The application 28, while executing on the processor 16, may endeavor to access a protected data object 22 within the computing environment 20. However, this exemplary embodiment 40 features an exemplary system 44 configured to access a portion of the computing environment 20 on behalf of the application 28 executing within the virtual environment 26. In order to achieve this accessing, the exemplary system 44 interacts with an authorization server 42 that is provided to secure the computing environment 20, e.g., by providing authorization tokens 48 that specify various access authorizations with respect to various applications 28. The exemplary system 44 may therefore comprise an authorization token store 46, which may be configured to store authorization tokens 48 authorizing access to respective portions of the computing environment 20 (e.g., to particular sets of data objects 22 specified by respective authorization tokens 48 to various applications 28, and the types of operations that may be applied thereto.) The exemplary system 44 may also comprise an authorization requesting component 50, which may be configured to request an authorization token 48 authorizing access to the portion of the computing environment 20 (e.g., to particular data objects 28 selected by the user 14) from the authorization server 42, and may use at least one credential, such as a username and password associated with the user 14. The authorization requesting component 50 may also, upon receiving the authorization token 48 from the authorization server 42, store the authorization token 48 in the authorization token store 46. The exemplary system 44 may also comprise a computing environment component 52, which may be configured to access the portion of the computing environment 20 on behalf of the application 28, e.g., by identifying in the authorization token store 46 an authorization token 48 authorizing access to the portion of the computing environment 20. Upon failing to identify the authorization token 48, the computing environment component 52 may invoke the authorization requesting component 50 to obtain the authorization token 48 from the authorization server 42 (if authorized); conversely, upon identifying the authorization token 48, the computing environment component 52 may access the portion of the computing environment 20 with the authorization token 48. In this manner, the exemplary system 44 may promote the accessing of the computing environment 20 by the application 28 executing within the virtual environment 26 according to a set of authorization details particularly defined by the user 14, while also respecting the isolation policies of the virtual environment 26.

Figure 3:
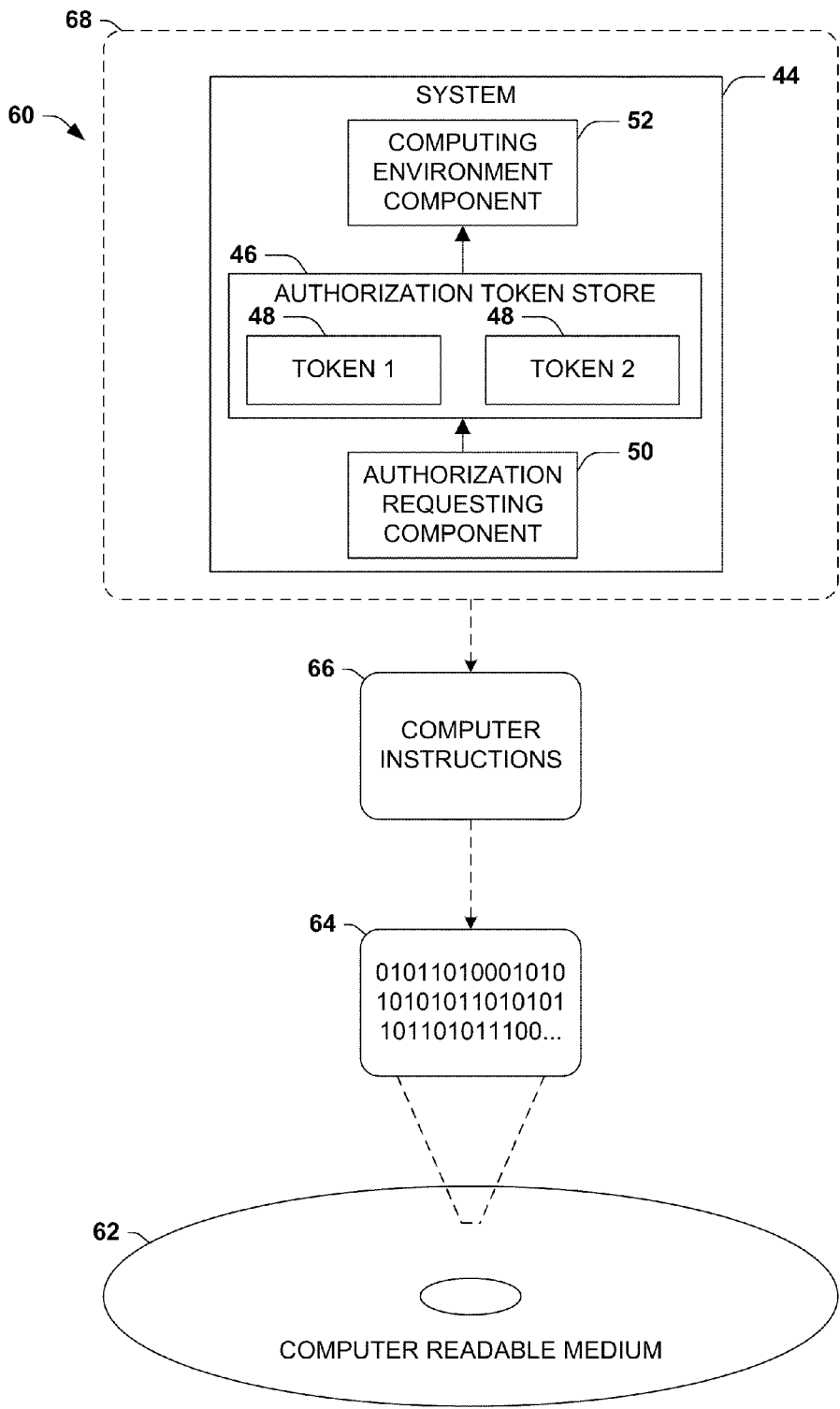
FIG. 3 is an illustration of an exemplary computer-readable medium comprising processor-executable instructions configured to embody one or more of the provisions set forth herein.

FIG. 3 illustrates another embodiment involves a computer-readable medium comprising processor-executable instructions configured to apply the techniques presented herein. An exemplary computer-readable medium that may be devised in these ways is illustrated in FIG. 3, wherein the implementation 60 comprises a computer-readable medium 62 (e.g., a CD-R, DVD-R, or a platter of a hard disk drive), on which is encoded computer-readable data 64. This computer-readable data 64 in turn comprises a set of computer instructions 66 configured to operate according to the principles set forth herein. In one such embodiment, the processor-executable instructions 66 may be configured to implement a system configured to access a portion of a computing environment hosted by a computing environment host and secured by an authorization server on behalf of an application executing within a virtual environment, such as the exemplary system 44 of FIG. 2. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary system 44 of FIG. 2) to confer individual and/or synergistic advantages upon such embodiments.

A first aspect that may vary among embodiments of these techniques relates to the scenarios in which the techniques may be applied. While these techniques involve the interactive cooperation of an application, a virtual environment, a computing environment, and an authorization server implementing an authorization token scheme, each of these components may vary in many ways. As a first example of this first aspect, the application may comprise many types of applications hosted in a virtual environment, such as a web application executing within a web browser or an application configured for execution on a particular machine and executing within an emulation of the machine. The application might also be configurable in various ways, e.g., for execution in different contexts. In one such embodiment, the application may be configurable to execute either within the virtual environment (e.g., within a web browser) or natively (e.g., as a standalone process presented in a dedicated window of a graphically oriented operating system.) Moreover, the interfacing of the application with the computing environment may be separated from the contextual configuration. This feature may be particularly advantageous because if the application utilizes the same interface to the computing environment, the functionality of the application and its access authorization may be achieved in a similar manner, thus enhancing the consistent processing of the application regardless of its execution context.

As a second example of this first embodiment, the application may also vary in relation to the functionality provided by an application host. In one such embodiment, the application may rely on the application host for data services in addition to the provision of the application resources for installation on the computer, such as database services provided by a database application host for a data-driven client application. In another such embodiment, portions of the application may be performed by the application host; e.g., a computationally powerful application host may perform high-performance data processing on behalf of a client executing on a lower-performance computer, or the application may execute on the computer as a thin client that allocates all processing except input and output operations to the application host. In yet another such embodiment, with regard to the management of the application by the application host, the application may be configurable to execute in an application host connection context, such as a connected context or a disconnected context. For example, the application may be configured for online or offline execution, such as by storing the application resources in a browser application cache. Such an application may be configured, e.g., to detect the connected availability of the application host, and may use local representations of application resources while disconnected and live (remotely hosted) representations of the application resources while connected.

As a third example of this first aspect, the authorization server and the authorization token scheme may be implemented in many ways. In one set of embodiments, many cryptographic algorithms may be suitable for encrypting, decrypting, signing, and verifying such authentication tokens, including asymmetric algorithms (e.g., RSA, DSS, Diffie-Helman, and elliptic curve techniques) and symmetric techniques (e.g., AES/Rijndael and RC4.) In another set of embodiments, the authorization server may comprise a particular computer or device, including a dedicated computer or device that only is only tasked with the provision of authorization tokens, a service or invokable library operating on the computer, the application host, and/or the computing environment host, etc. In yet another set of embodiments, the authorization server may encrypt the contents of the authorization token as part of the generation, and such encryption may involve the same encryption algorithm as for the signing or another encryption algorithm, or may issue the authorization token in an unencrypted form, etc. It may be appreciated by those of ordinary skill in the art of cryptography that many token generating and authenticating techniques may be incorporated in embodiments of the techniques discussed herein.

As a fourth example of this first aspect, the computing environment and computing environment host may vary in many aspects. As one such example, the computing environment may exist only on the computer, which may also operate as the computing environment host. Alternatively, the computing environment may be distributed across several computers and devices in an uncoordinated or peer-to-peer manner; e.g., the application may execute within a virtual environment on a first computer, but may access a portion of the computing environment stored on another computer. As another alternative, the computing environment may represent a deployable computing environment that is deployed to a set of computers and devices and centrally managed by a computing environment host. In order to reduce the complex variety and decentralization of the data objects comprising a contemporary computing environment, a deployable representation of the computing environment may be devised, where the data objects comprising the computing environment are organized in a data object hierarchy, which may be hosted by a computing environment host. If the data objects are represented in a uniform manner and managed in a consistent way by a data object system, a set of services may be devised to apply to all data objects of the computing environment. The data object hierarchy may be delivered to various devices to represent the same computing environment (including the same user profiles, applications, data files, etc.), and each device may render the computing environment in a consistent manner but customized based on the capabilities of the device (e.g., a hard keyboard interface for receiving data entry from a keyboard device attached to a workstation, and a touchscreen software keyboard interface for receiving data entry from a cellphone device.) It may also be advantageous to configure at least one server to manage one or more data objects within the representation, and to accept operations sets to be applied to such data objects. A user of the deployable computing environment may therefore interact with the deployable computing environment in a platform- and device-independent manner.

Figure 4:
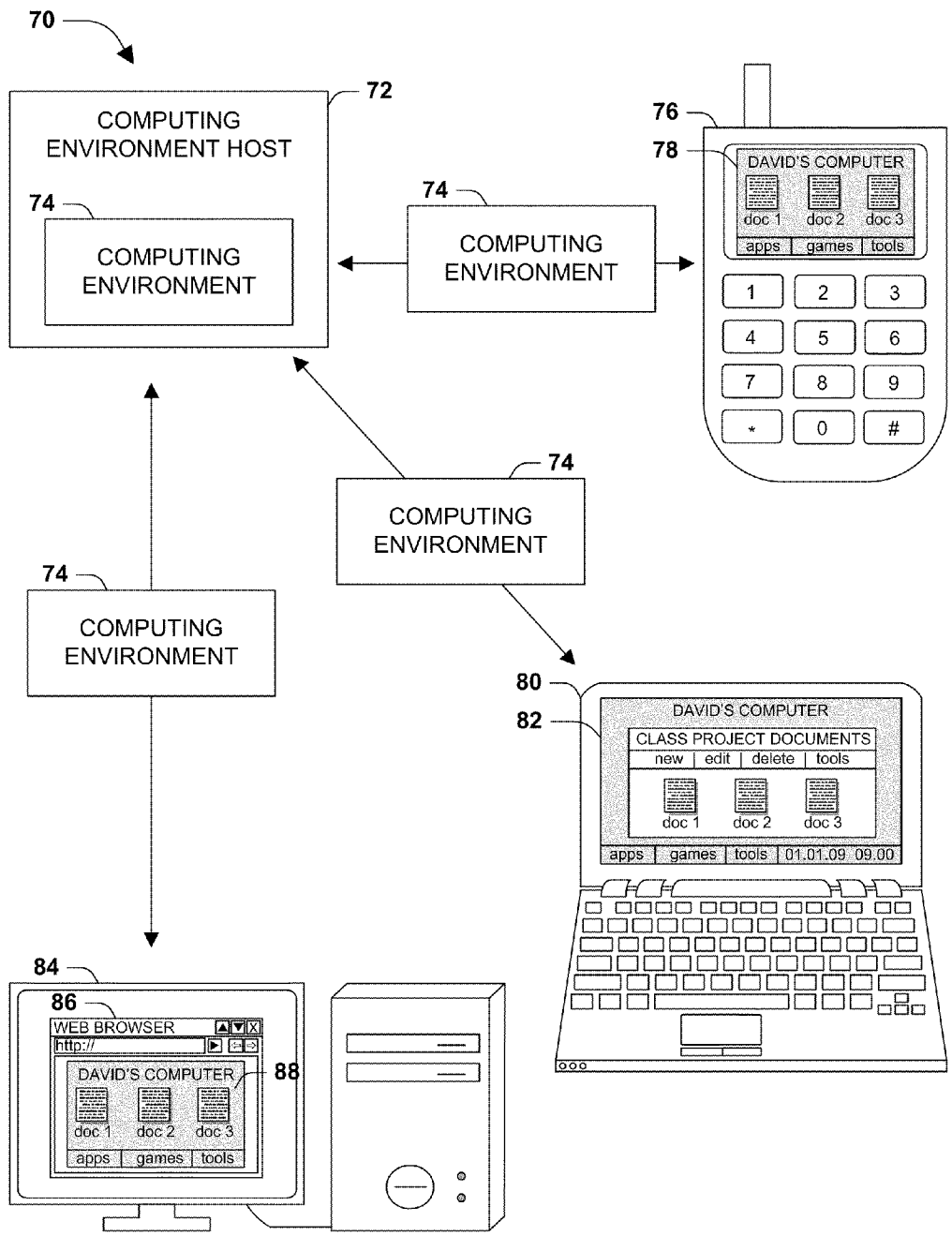
FIG. 4 is an illustration of a deployable computing environment administrated by a computing environment host and shared among a set of computers and devices.

FIG. 4 illustrates one such scenario 70, wherein the computing environment may be hosted by a computing environment host 72, which may store and manage a deployable computing environment 74. The computing environment host 72 may also render the deployable computing environment 74 in different ways on behalf of various devices, such as a cellphone device 76, a personal notebook computer 80, and a public workstation 84, and also on behalf of different types of users having different access privileges. The rendering of the computing environment therefore reflects a consistent computing environment across all devices that expose the same applications, user profiles, shell configuration, user data objects, etc. Thus, a user may access a full-featured version 82 of the computing environment through a high-performance notebook computer, a stripped-down version 78 of the computing environment on a low-power cellphone device 76, and a browser-compatible and privacy-oriented version 88 of the computing environment through a web browser 76 of a public terminal 84. To the extent that the capabilities of each such device support the rendering of the computing environment, a consistent user interface and data set may be presented due to the rendering of the deployable computing environment 74 adjusted to the capabilities of each device. Updates to the computing environment may be propagated back to the computing environment host 72, and may be automatically synchronized with other devices.

Figure 5:
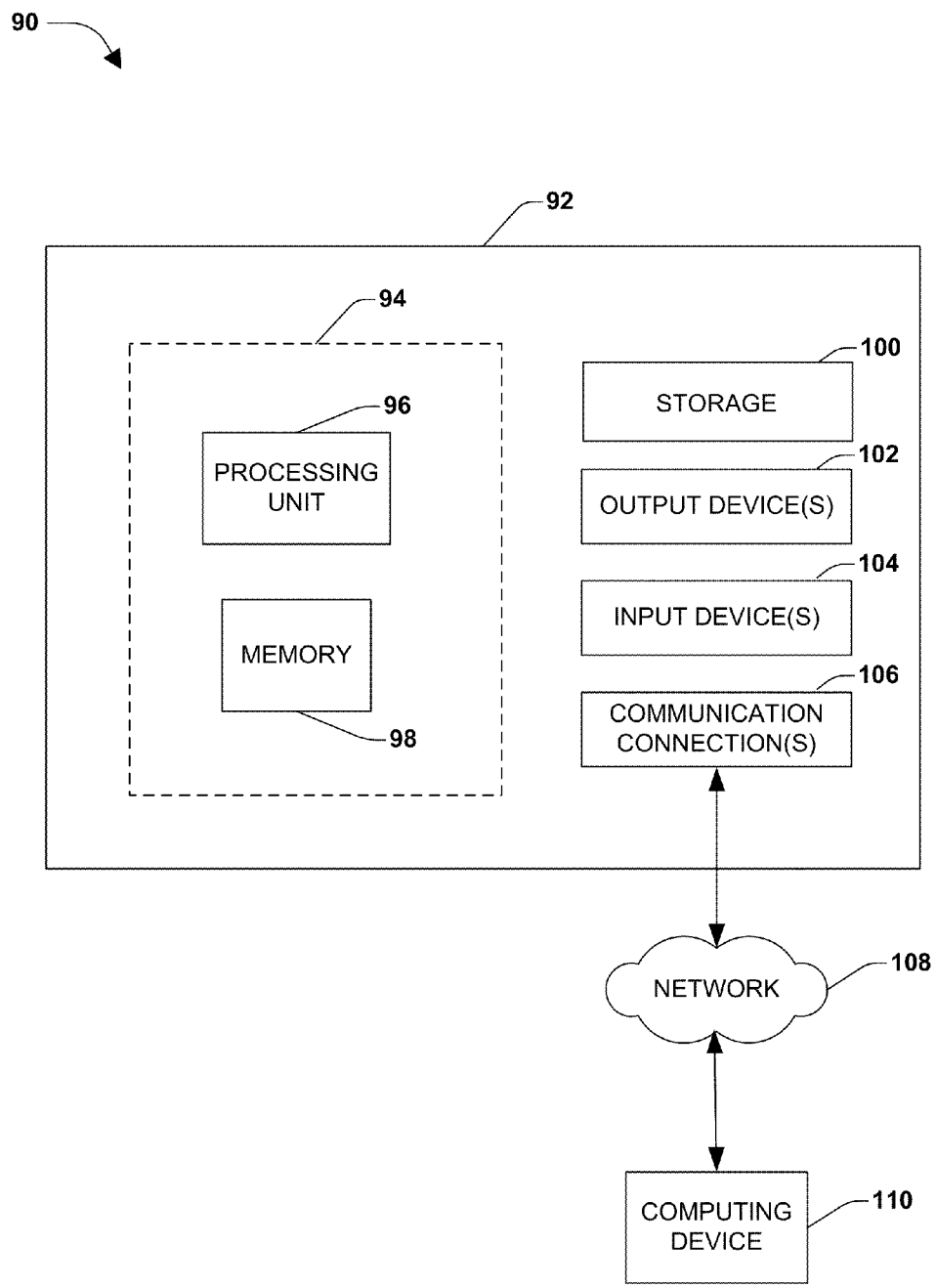
FIG. 5 illustrates an exemplary computing environment wherein one or more of the provisions set forth herein may be implemented.

The various devices illustrated in FIG. 5 may also cooperate by sharing locally stored data with other devices, and by controlling or being controlled by other devices. Hence, the computing environment may therefore be devised and presented as a cloud computing architecture, comprising a device-independent representation (a "cloud") expressed as a consistent rendering across all devices ("clients") that form a mesh of cooperating portals (with device-specific properties) to the same computing environment. Specifically with respect to the applications of the computing environment, the deployable computing environment 74 may include a representation of the application set, the application resources, and the data objects created thereby. Moreover, the computing environment host 72 may apply services to the various objects comprising the deployable computing environment 74, and the common format in which the data objects are stored in the deployable computing environment 74 may facilitate consistent availability and application of the services regardless of the nature of the data objects applied thereto. However, those of ordinary skill in the art may devise many types of computing environments and computing environment hosts that may be incorporated in the techniques discussed herein.

A second aspect that may vary among embodiments of these techniques relates to the semantics of requesting, generating, and utilizing the authorization tokens. As a first example, the authorization token may be requested by providing various pieces of information. As a first example, the request for the authorization token may identify a computing identifier portion, such as a request to access the complete computing environment; a request to access one or more particular data objects represented in the computing environment; all of the data objects represented in the computing environment matching one or more data object types (e.g., only document data objects and media object data objects); one or more event lists represented in the computing environment (e.g., a newsfeed indicating a related set of events arising within the computing environment), at least one device, contact, or user profile represented in the computing environment; etc. Alternatively or additionally, the request for the authorization token may include one or more access type identifiers that identify permissible operations on the portion of the computing environment. In one such embodiment, the request may specify types of operations that the requested accessing may entail, such as reading, writing, appending, truncating, creating, moving, renaming, and removing particular data objects. In another such embodiment, the request may specify a role that the requesting application may wish to adopt with regard to the requested portion of the computing environment. For example, the application may request access to the identified portion of the computing environment in a reader role (entailing read-only access to the referenced data objects and newsfeeds related thereto), in a contributor role (entailing only read and write access to the referenced data objects and newsfeeds related thereto), or as an owner role (entailing full privileges, such as the authority to delegate and revoke rights to other applications, users, computers, and devices.) Alternatively or additionally, the request for the authorization token may include one or more identity identifiers that identify the requester of the authorization token, such as the application, a user of the application, and/or a computer or device executing the application.

A second example of this second aspect relates to additional features of the semantics of the authorization tokens. For example, the authorization server may provide one authorization token for each application, or may provide a set of authorization tokens for each application that respectively indicate one type of authorized accessing of the computing environment, or may provide one authorization token that indicates the authorization of all applications, etc. Alternatively or additionally, the authorization token may also include other details of the authorization, such as a particular source for the data objects comprising the requested portion of the computing environment (e.g., which server is to be used in a server farm hosting of the computing environment), or security credentials to be used by the application when accessing the data object (e.g., an account and password to use when accessing the computing hosting the data objects.) The authorization token comprising an authorization duration, such as the amount of time for which access is authorized. In this example, the authorization requesting component may be configured to remove the authorization token from the authorization token store after expiration of the authorization duration, and/or to request a refresh of the authorization token. Alternatively or additionally, the authorization requesting component may provide to the authorization server while requesting the authorization token a reference to a privacy policy document, which may describe a privacy policy of the application (e.g., a pledge by the application host that the accessed data objects will be used only in certain ways.)

As a third example of this second aspect, the mechanism of exchanging the authorization tokens may vary among embodiments of these techniques. As a first example, the application may contact a locally hosted authorization server via an interprocess communication technique, or may contact a remotely hosted authorization server via a remote process communication technique or a network protocol. In one such embodiment, the authorization server may comprise a web service, whereby authorization tokens may be requested by submitting an HTTP request containing various parameters (e.g., the portion of the computing environment for which access is requested, the access type, and/or credentials such as identity identifiers), such as encoded via as HTTP POST or HTTP GET. Moreover, where the application comprises a web application executing in a web browser of the computer, the authorization token request may specify a return address, and the authorization requesting component may, upon receiving the authorization token, navigate the web browser to the return address, or to any other return address associated with the web application. As a second example, the requesting and authorizing of access may be performed automatically without involving a user of the application and/or a user of the computing environment. Alternatively, the authorizing may be interactively designed, such that the authorization of access depends on the consent of a user. In one such embodiment, the authorization requesting component may facilitate the process of requesting the user to authorize access to the portion of the computing environment, e.g., by presenting an application access request within the virtual environment to the user of the application, and upon receiving such authorization from the user, proceeding to request the authorization token while including the user authorization as a credential. Those of ordinary skill in the art may devise many techniques for organizing the process of requesting, generating, and using authorization tokens while implementing the techniques discussed herein.

A third aspect that may vary among embodiments of these techniques relates to the architecture of the system and the components with which the system interacts. As a first example, it may be advantageous to configure the computing environment component to execute outside of the virtual environment; for example, this configuration may enable the services provided by the computing environment component to be applied independently of the operation and existence of any particular application or the virtual environment (e.g., the computing environment component may perform operations on the computing environment even if a web browser is not executing.) However, a difficulty may arise in enabling an application executing within the virtual environment to access the computing environment component executing outside of the virtual environment due to the isolation policy of the virtual environment. In order to address this difficulty, the system may include a virtual environment interface that is operably coupled with the computing environment component, but that executes within the virtual environment. The virtual environment interface may receive operations on the computing environment from applications and may submit the operations to the computing environment component. For example, where the application comprises a web application executing within a web browser, the virtual environment component may comprise a browser plug-in that is configured to access the computing environment component on behalf of applications executing within the web browser.

As a second example of this third aspect, various components of the system may comprise a programmatic interface, which may expose to applications one or more operations that may be invoked to request an authorization token and/or to perform various operations on the computing environment. A programmatic interface may be included, e.g., in the computing environment interface, and applications executing within the virtual environment may invoke the operations to interact with the authorization tokens of the application and/or the accessing of the computing environment using such tokens. Moreover, the programmatic interface may be implemented based on familiar technologies, such as JavaScript, which may permit developers to access the computing environment through the programmatic interface in a convenient manner and with a reduction of application redesign.

As a third example of this third aspect, the authorization tokens may be requested at various times. In a first such embodiment, the authorization tokens may be requested and stored during an installation of the application, e.g., when the user first requests the installation of the application in the computer. For example, the virtual environment may, upon receiving an application from the application host, or even upon receiving a request to install the application, identify the types of computing environment access that may be involved, and may request the user to authorize particular types of computing environment access. Alternatively or additionally, the authorization tokens may be requested during runtime, e.g., when the application is first executed by the user, and/or on a just-in-time basis, e.g., when the application seeks to apply a particular operation to the computing environment.

As a fourth example of this third aspect, the authorization tokens may be stored in various ways. As a first example, the authorization token store may be included as a portion of the computing environment, such as files within the filesystem that comprises the computing environment. This storing may be advantageous, e.g., for permitting the authorization tokens to be protected by a similar access control mechanism as the other protected data objects of the computing environment. In addition, a first application may request a delegation of some privileges already delegated to a second application by requesting an authorization access to the second application. Additionally, the computing environment may be configured to store at least one application authorization mapping that associates the application with the authorization token in the computing environment; e.g., the computing environment may include a reference of an application to the respective data objects representing the authorization tokens stored in the computing environment. As a second example, the authorization token store may be stored by the computing environment host and/or the authorization server, which may promote a centralized administration of the authorization tokens and may promote the security of the authorization token scheme. Those of ordinary skill in the art may devise many architectures within which the techniques described herein may operate.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

FIG. 5 and the following discussion provide a brief, general description of a suitable computing environment to implement embodiments of one or more of the provisions set forth herein. The operating environment of FIG. 5 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 5 illustrates an example of a system 90 comprising a computing device 92 configured to implement one or more embodiments provided herein. In one configuration, computing device 92 includes at least one processing unit 96 and memory 98. Depending on the exact configuration and type of computing device, memory 98 may be volatile (such as RAM, for example), non-volatile (such as ROM, flash memory, etc., for example) or some combination of the two. This configuration is illustrated in FIG. 5 by dashed line 94.

In other embodiments, device 92 may include additional features and/or functionality. For example, device 92 may also include additional storage (e.g., removable and/or non-removable) including, but not limited to, magnetic storage, optical storage, and the like. Such additional storage is illustrated in FIG. 5 by storage 100. In one embodiment, computer readable instructions to implement one or more embodiments provided herein may be in storage 100. Storage 100 may also store other computer readable instructions to implement an operating system, an application program, and the like. Computer readable instructions may be loaded in memory 98 for execution by processing unit 96, for example.

The term "computer readable media" as used herein includes computer storage media. Computer storage media includes volatile and nonvolatile, removable and non-removable media implemented in any method or technology for storage of information such as computer readable instructions or other data. Memory 98 and storage 100 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 92. Any such computer storage media may be part of device 92.

Device 92 may also include communication connection(s) 106 that allows device 92 to communicate with other devices. Communication connection(s) 106 may include, but is not limited to, a modem, a Network Interface Card (NIC), an integrated network interface, a radio frequency transmitter/receiver, an infrared port, a USB connection, or other interfaces for connecting computing device 92 to other computing devices. Communication connection(s) 106 may include a wired connection or a wireless connection. Communication connection(s) 106 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 92 may include input device(s) 104 such as keyboard, mouse, pen, voice input device, touch input device, infrared cameras, video input devices, and/or any other input device. Output device(s) 102 such as one or more displays, speakers, printers, and/or any other output device may also be included in device 92. Input device(s) 104 and output device(s) 102 may be connected to device 92 via a wired connection, wireless connection, or any combination thereof. In one embodiment, an input device or an output device from another computing device may be used as input device(s) 104 or output device(s) 102 for computing device 92.

Components of computing device 92 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 92 may be interconnected by a network. For example, memory 98 may be comprised of multiple physical memory units located in different physical locations interconnected by a network.

Those skilled in the art will realize that storage devices utilized to store computer readable instructions may be distributed across a network. For example, a computing device 110 accessible via network 108 may store computer readable instructions to implement one or more embodiments provided herein. Computing device 92 may access computing device 110 and download a part or all of the computer readable instructions for execution. Alternatively, computing device 92 may download pieces of the computer readable instructions, as needed, or some instructions may be executed at computing device 92 and some at computing device 110.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A system configured to access a portion of a computing environment stored by a device and secured by an authorization server on behalf of an application executing within a virtual environment, the system comprising:
   an authorization token store configured to store authorization tokens authorizing access to respective portions of the computing environment;
   an authorization requesting component configured to:
      request an authorization token from the authorization server using at least one credential, and
      upon receiving an authorization token indicating an authorization by the authentication server of at least one operation performable on the portion of the computing environment, store the authorization token in the authorization token store; and
   a computing environment component configured to perform a selected operation on the portion by:
      identifying in the authorization token store an authorization token authorizing the selected operation on atoll the portion;
      upon failing to identify the authorization token, invoking the authorization requesting component to obtain the authorization token; and
      upon identifying the authorization token, performing the selected operation on the portion of the computing environment stored by the device with the authorization token.

2. The system of claim 1:
   the application managed by an application host, and
   the application configured to execute in an application host connection context selected from a set of application host connection contexts comprising a connected context and a disconnected context.

3. The system of claim 2, the authorization token authorizing the application host to access to the portion.

4. The system of claim 1, the computing environment comprising a deployable computing environment hosted by a computing environment host.

5. The system of claim 1:
   the computing environment component configured to execute outside of the virtual environment, and
   the system comprising a virtual environment interface executing within the virtual environment and configured to invoke the computing environment component to access the computing environment on behalf of the application.

6. The system of claim 5, the virtual environment interface comprising a programmatic interface comprising at least one operation configured to request the authorization token using the at least one credential on behalf of at least one application.

7. The system of claim 1:
   the virtual environment comprising a web browser, and
   the application comprising a web application executing within the web browser.

8. The system of claim 7:
   the authorization server comprising a web service, and
   the authorization requesting component configured to request the authorization token by:
      accessing a token authorizing address of the web service, and
      upon receiving the authorization token, navigating the web browser to a return address associated with the web application.

9. The system of claim 1, the authorization requesting component configured to request the authorization token by providing to the authorization server:
   at least one computing environment portion identifier identifying the portion of the computing environment;
   at least one access type identifier identifying permissible operations on the portion; and
   at least one identity identifier.

10. The system of claim 9, the access type identifier comprising at least one role selected from a set of roles comprising an owner role, a contributor role, and a reader role.

11. The system of claim 9, the computing environment portion identifier selected from a set of portions of the computing environment comprising:
   a complete computing environment;
   at least one data object represented in the computing environment;
   at least one data object type of at least one data object represented in the computing environment;
   at least one event list represented in the computing environment;
   at least one device represented in the computing environment;
   at least one contact represented in the computing environment; and
   at least one user profile represented in the computing environment.

12. The system of claim 9, the at least one identity identifier selected from an identity set comprising:
   the application;
   a user of the application; and
   an application host of the application.

13. The system of claim 9, the authorization requesting component configured to provide to the authorization server while requesting the authorization token at least one privacy policy document describing a privacy policy of the application.

14. The system of claim 1:
   the authorization token comprising an authorization duration, and
   the authorization requesting component configured to remove the authorization token from the authorization token store after expiration of the authorization duration.

15. The system of claim 1, the authorization requesting component configured to:
   present within the virtual environment to a user of the application an application access request, and
   upon receiving a user authorization of the application access request, request the authorization token, the at least one credential including the user authorization.

16. The system of claim 1, the authorization requesting component configured to request the authorization token for the application upon receiving a request to install the application in the computing environment.

17. The system of claim 1, the authorization token store comprising a portion of the computing environment.

18. The system of claim 17, the computing environment configured to store at least one application authorization mapping that associates the application with the authorization token in the computing environment.

19. A computer-readable storage device comprising instructions that, when executed on a processor of a device storing a computing environment, cause the device to perform a selected operation on a portion of the computing environment secured by an authorization server on behalf of an application executing within a virtual environment by:
    storing in an authorization token store at least one authorization token indicating an authorization by the authorization service of at least one operation performable on respective portions of the computing environment;
    requesting an authorization token from the authorization server using at least one credential;
    upon receiving an authorization token indicating an authorization by the authentication server of at least one operation performable on the portion of the computing environment, storing the authorization token in the authorization token store;
    identifying in the authorization token store an authorization token by the authorization service authorizing the selected operation on the portion;
    upon failing to identify the authorization token, invoking the authorization requesting component to obtain the authorization token; and
    upon identifying the authorization token, performing the selected operation on the portion of the computing environment stored by the device with the authorization token.

20. A system configured to access a portion of a deployable computing environment hosted by a computing environment host stored by a device and secured by an authorization server on behalf of an application executing within a virtual environment, the application managed by an application host and configured to execute in an application host connection context selected from a set of application host connection contexts comprising a connected context and a disconnected context, the system comprising:
    an authorization token store configured to store authorization tokens authorizing access to respective portions of the computing environment;
    an authorization requesting component configured to:
        request an authorization token from the authorization server using at least one credential by providing to the authorization server:
            at least one computing environment portion identifier identifying the portion of the computing environment selected from a set of portions of the computing environment comprising:
                a complete computing environment,
                at least one data object represented in the computing environment,
                at least one data object type of at least one data object represented in the computing environment,
                at least one event list represented in the computing environment,
                at least one device represented in the computing environment,
                at least one contact represented in the computing environment, and
                at least one user profile represented in the computing environment;
            at least one access type identifier identifying operations performable on the portion and comprising at least one role selected from a set of roles comprising an owner role, a contributor role, and a reader role;
            at least one identity identifier selected from an identity set comprising:
                the application,
                a user of the application, and
                an application host of the application; and
            at least one privacy policy document describing a privacy policy of the application;
        upon receiving an authorization token indicating an authorization by the authentication server of at least one operation performable on the portion of the computing environment, storing the authorization token in the authorization token store;
        remove the authorization token from the authorization token store after expiration of an authorization duration specified by the authorization token;
    a computing environment component configured to execute outside of the virtual environment and to perform a selected operation on the portion by:
        identifying in the authorization token store an authorization token authorizing the selected operation on the portion;
        upon failing to identify the authorization token, invoking the authorization requesting component to obtain the authorization token; and
        upon identifying the authorization token, performing the selected operation on the portion of the computing environment stored by the device with the authorization token; and
    a virtual environment interface executing within the virtual environment and configured to invoke the computing environment component to perform a selected operation on the computing environment on behalf of the application, and comprising a programmatic interface available in the virtual environment, at least one of the operations comprising requesting the authorization token using the at least one credential.

* * * * *